US010421324B2

(12) United States Patent
DelMaestro

(10) Patent No.: US 10,421,324 B2
(45) Date of Patent: Sep. 24, 2019

(54) HITCH MOUNTED CARGO LIFTING DEVICE

(71) Applicant: Joseph DelMaestro, Nutley, NJ (US)

(72) Inventor: Joseph DelMaestro, Nutley, NJ (US)

( * ) Notice: Subject to any disclaimer, the term of this patent is extended or adjusted under 35 U.S.C. 154(b) by 0 days.

(21) Appl. No.: 15/011,292

(22) Filed: Jan. 29, 2016

(65) Prior Publication Data

US 2017/0217270 A1   Aug. 3, 2017

(51) Int. Cl.
*B60P 7/02* (2006.01)
*B60P 9/00* (2006.01)
*B60P 1/44* (2006.01)
*B60D 1/58* (2006.01)

(52) U.S. Cl.
CPC .............. *B60D 1/58* (2013.01); *B60P 1/44* (2013.01); *B60P 7/02* (2013.01); *B60P 9/00* (2013.01); *B60P 1/4485* (2013.01)

(58) Field of Classification Search
CPC ...... B60P 9/00; B60P 9/06; B60P 1/44; B60P 1/4414; B60P 1/483; B60P 7/02; B60P 1/4421; B60P 1/4485; B60P 1/4428
USPC ................ 414/462, 463, 464, 465, 466, 491
See application file for complete search history.

(56) References Cited

U.S. PATENT DOCUMENTS

| | | | |
|---|---|---|---|
| 3,666,122 A * | 5/1972 | Youmans | B60P 1/4414 414/501 |
| 3,842,997 A * | 10/1974 | Sprikkelman | B60P 1/4414 414/557 |
| 4,881,864 A | 11/1989 | Amato | |
| 5,456,564 A * | 10/1995 | Bianchini | B60R 9/06 414/462 |
| 5,941,677 A * | 8/1999 | De Boer | B60P 1/4414 414/557 |
| 6,164,895 A | 12/2000 | Croswell | |
| 6,296,290 B1 * | 10/2001 | Wolf | B60P 1/43 414/462 |
| 6,685,421 B1 | 2/2004 | Reeves | |
| 6,821,075 B2 | 11/2004 | der | |
| 7,484,921 B2 * | 2/2009 | Murphy | B60P 1/4421 414/462 |
| 9,090,200 B2 * | 7/2015 | Maier | B60P 1/4471 |
| 9,096,160 B2 * | 8/2015 | Le Anna | B60R 9/06 |
| 9,403,469 B2 * | 8/2016 | Parker | B60P 1/4414 |
| 2001/0014272 A1 * | 8/2001 | Ochoa | B60P 1/4414 414/462 |
| 2004/0256607 A1 | 12/2004 | Spitsbergen | |

(Continued)

*Primary Examiner* — James R Bidwell
(74) *Attorney, Agent, or Firm* — F. Chau & Associates, LLC

(57) ABSTRACT

A hitch mounted cargo lifting device for lifting large objects onto a cargo bed of a vehicle to which it is attached includes a discrete hitch attachment, pivot member, and cradle member. One side of the pivot member is fixedly attached to the cradle member, and the other is hingedly attached to the hitch attachment. This allows the pivot member and cradle attachment to be moved between a loading position in which the cradle attachment is adjacent to a ground surface, and an unloading position in which the cradle attachment is adjacent to and aligned with the vehicle's cargo bed. In some embodiments, a motor driven reeled wire is provided to supply the force to move the pivot member and cradle attachment between the unloading and loading positions. Conventional cargo straps may be used to secure the cargo to the cradle.

12 Claims, 4 Drawing Sheets

(56) References Cited

U.S. PATENT DOCUMENTS

| | | | |
|---|---|---|---|
| 2005/0002769 A1* | 1/2005 | Scheibel | B60P 1/4428 414/540 |
| 2005/0118006 A1* | 6/2005 | Studer | B60P 1/16 414/491 |
| 2007/0065262 A1* | 3/2007 | Murphy | B60P 1/4471 414/462 |
| 2010/0124479 A1 | 5/2010 | Brooks | |
| 2013/0230374 A1* | 9/2013 | Kerkvliet | B60P 1/6463 414/477 |

* cited by examiner

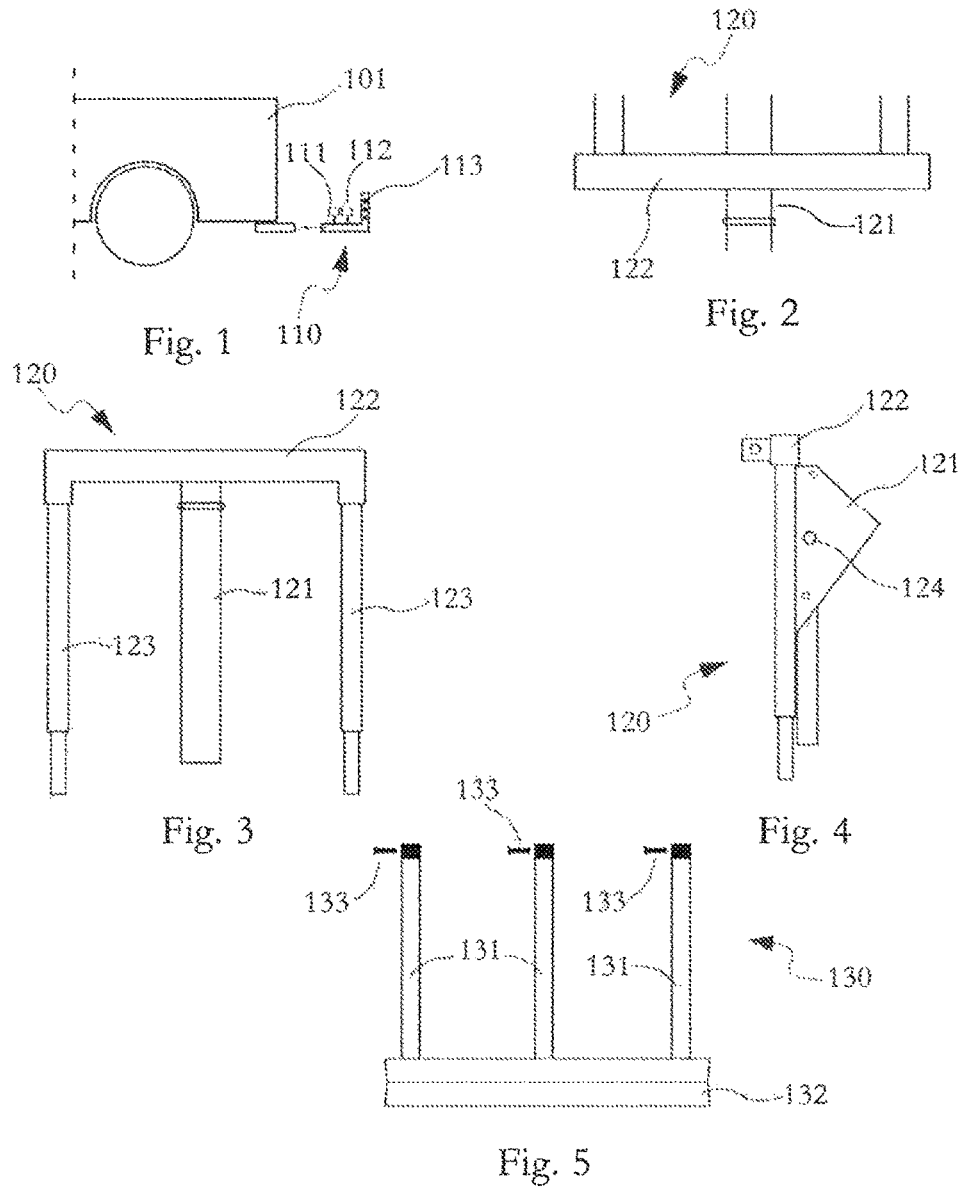

US 10,421,324 B2

HITCH MOUNTED CARGO LIFTING DEVICE

BACKGROUND OF THE INVENTION

Field of the Invention

This invention relates generally to article handling devices and, more particularly, to a portable cargo lifting device mountable to a conventional hitch assembly.

Description of the Prior Art

The use of vehicles having flat beds for transporting large objects is well known. A problem which still exists, however, is that many conventional vehicles with flat beds do not include any structural device which actually helps a user get a large object thereon in order to be transported. Thus, there remains a need for a cargo lifting device which can receive a large object and lift it from a ground surface to a height which allows it to be slid onto a cargo bed. It would be helpful if such a cargo lifting device was adapted to be mounted to a conventional vehicle hitch and pivot therefrom in raising objects from the ground surface. It would be additionally desirable for such a cargo lifting device to include an actuator operative to flip a cradle portion from a vertical position to a horizontal position so as to "flip" desired cargo off of the ground surface to an elevated position.

The Applicant's invention described herein provides for a hitch mounted cargo lifting device adapted to allow a user to lift an object off the ground to an elevated height by pivoting a cradle from a substantially vertical position to a horizontal position. The primary components in Applicant's cargo lifting device are a hitch attachment, a pivot member, and a cradle. When in operation, the cargo lifting device enables large and/or heavy objects (such as vending machines) to be mechanically lifted to a cargo bed or lowered from a cargo bed. As a result, many of the limitations imposed by prior art structures are removed.

SUMMARY OF THE INVENTION

A hitch mounted cargo lifting device for lifting large objects onto a cargo bed of a vehicle to which it is attached. The hitch mounted cargo lifting device comprises a discrete hitch attachment, pivot member, and cradle member. One side of the pivot member is fixedly attached to the cradle member, and the other is hingedly attached to the hitch attachment. This allows the pivot member and cradle attachment to be moved between a loading position in which the cradle attachment is adjacent to a ground surface, and an unloading position in which the cradle attachment is adjacent to and aligned with the vehicle's cargo bed. In some embodiments, a motor driven reeled wire is provided to supply the force to move the pivot member and cradle attachment between the unloading and loading positions. Conventional cargo straps may be used to secure the cargo to the cradle.

It is an object of this invention to provide a cargo lifting device which can receive a large object and lift it from a ground surface to a height which allows it to be slid onto a cargo bed.

It is another object of this invention to provide a cargo lifting device adapted to be mounted to a conventional vehicle hitch and pivot therefrom in raising objects from the ground surface.

It is yet another object of this invention to provide a cargo lifting device which includes a motorized actuator operative to flip a cradle portion from a vertical position to a horizontal position so as to "flip" desired cargo off of the ground surface to an elevated position.

These and other objects will be apparent to one of skill in the art.

BRIEF DESCRIPTION OF THE DRAWINGS

FIG. 1 is a side elevational view of a hitch attachment of a hitch mounted cargo lifting device built in accordance with the present invention.

FIG. 2 is a top plan view of a pivot member of a hitch mounted cargo lifting device built in accordance with the present invention.

FIG. 3 is a front elevational view of a pivot member of a hitch mounted cargo lifting device built in accordance with the present invention.

FIG. 4 is a side elevational view of a pivot member of a hitch mounted cargo lifting device built in accordance with the present invention.

FIG. 5 is a front elevational view of a cradle member of a hitch mounted cargo lifting device built in accordance with the present invention.

DETAILED DESCRIPTION OF THE INVENTION

Figure 6:
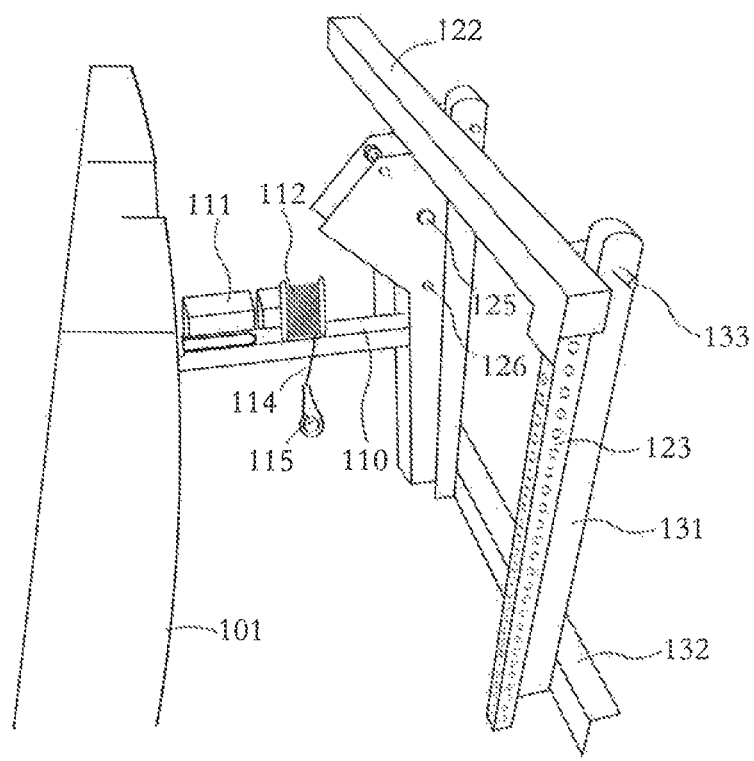
FIG. 6 is a rear perspective view of a hitch mounted cargo lifting device built in accordance with the present invention shown attached to a vehicle with the cradle member and pivot member in the loading position.

Referring now to the drawings and in particular FIGS. 1-8, a hitch mounted cargo lifting device 100 is shown having a discrete hitch attachment 110, pivot member 120, and cradle member 130. The hitch attachment 110 defines in the preferred embodiment a rigid, "L" shaped hitch mounting bar which includes a hitch attaching section that is operative to attach in a conventional manner to a conventional tow hitch, an integrated motor 111, and wire reel 112. In the preferred embodiment, the pivot member 120 includes a central mount 121 attached to a cross bar 122 that includes a telescoping support limb 123 extending from each end. The cradle member 130 defines in the preferred embodiment three vertical back bars 131 fixedly attached to a horizontal support shelf 132.

Figure 7:
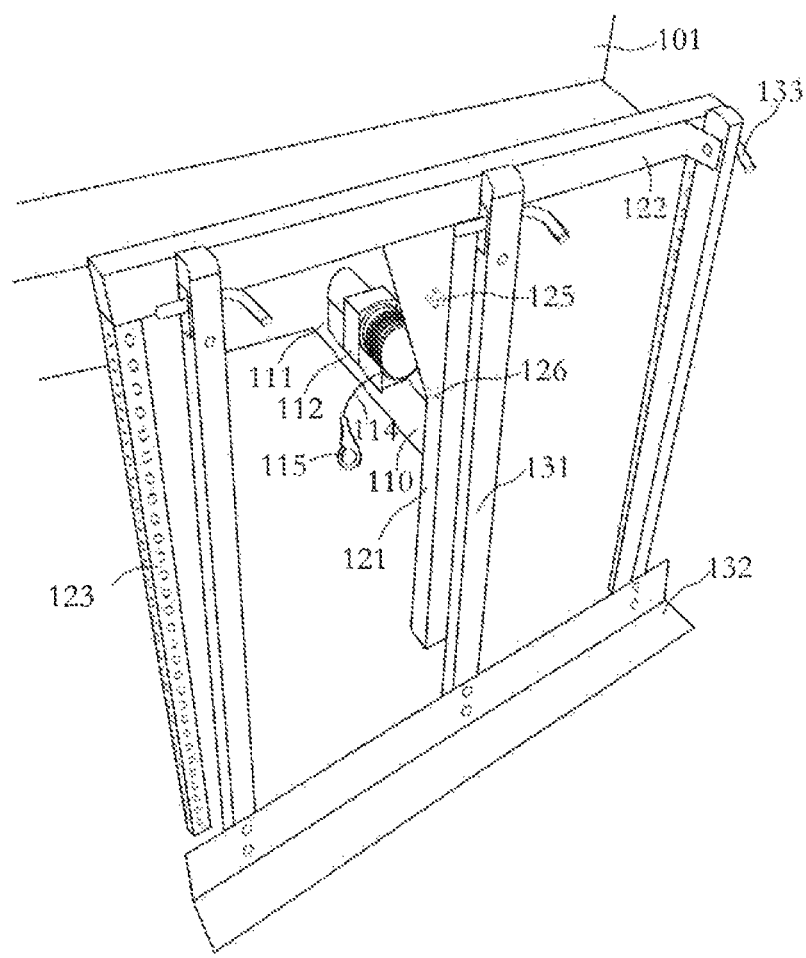
FIG. 7 is a side perspective view of a hitch mounted cargo lifting device built in accordance with the present invention shown attached to a vehicle with the cradle member and pivot member in the loading position.
Figure 8:
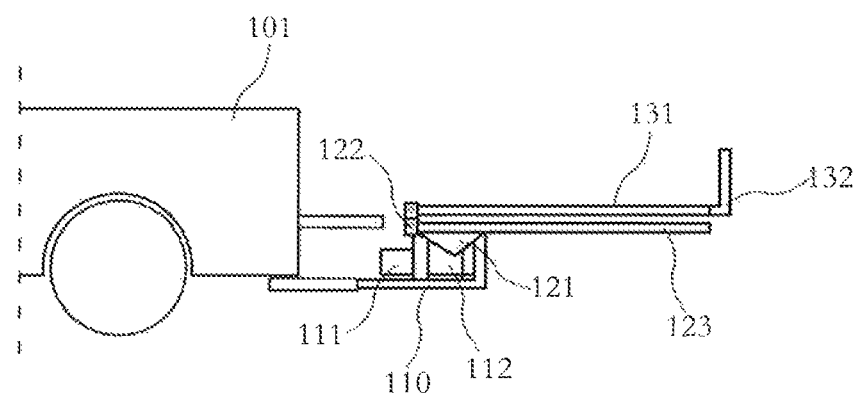
FIG. 8 is a side elevational view of a hitch mounted cargo lifting device built in accordance with the present invention shown attached to a vehicle with the cradle member and pivot member in the unloading position.

Assembled, one side of the pivot member 120 is hingedly attached to the hitch attachment 110 so as to allow it to be moved between a loading position, as illustrated in FIGS. 6 and 7, and an unloading position, as illustrated in FIG. 8. The cradle member 130 is attached to the side of the pivot member 120 on the side of the pivot member 120 opposite the side that is attached to the hitch attachment 110.

In the preferred embodiment, pivot member 120 and hitch attachment 110 are configured to hingedly attach through a pivoting aperture 124 on the central mount 121 and an attachment aperture 113 on the hitch attachment 110. Accordingly, the pivoting aperture 124 and attachment aperture 113 can be aligned with one another and receive a removable pivot bolt 125. The central mount 121 additionally includes a stopper bolt 126 which provides a stopping structure on which the pivot member 120 rests. Once assembled, the hitch attachment 110 can be secured to a tow hitch of a target vehicle 101 so as to attach the hitch mounted cargo lifting device to the vehicle. It is contemplated that the hitch mounted cargo lifting device 100 would be generally used on target vehicles 101 which include a cargo bed or other flat, elevated storage area.

When in the loading position, the hitch mounted cargo lifting device is operative to receive a target object in the cradle member 130, with the support shelf 132 positioned adjacent to a ground surface and being slid under the target object. The target object can then be secured against the support bars 131 with conventional cargo straps (not shown). In this regard, by hinging the pivot member 120 from the loading position to the unloading position, the large object which has been secured to the cradle member 130 can be lifted off a ground surface to a position parallel with the floor of the cargo bed of the target vehicle 101, allowing the large object to be unsecured from the cradle member 130 and slid horizontally onto the cargo bed.

Similarly, if the pivot member 120 is in the unloading position, a large object in the cargo bed of the target vehicle 101 can be slid onto the cradle member 130, secured thereto, and the pivot member 120 can be swung to the loading position so as to position the support shelf 132 adjacent to a ground surface, allowing the large object to be unsecured and slid off on to the ground surface.

In the preferred embodiment, the cradle member 130 is attached to the pivot member 120 with removable bolts 133 and when in the unloading position, the central mount 121, cross bar 122, and support limbs 123 are able to support the weight of the cradle member 130 and any object in place thereon.

The motor 111, defined as a 12 volt motor in the preferred embodiment, is operative to selectively wind and unwind the wire reel 112 to dispense or retract the wire 114 which can extend therefrom. In some embodiments the wire 114 includes a hook 115 which can be secured to the support shelf 132. In such embodiments, dispensing or retracting the wire 114 exerts sufficient force on the cradle member 130 and pivot member 120 to move the same from the unloading position to the loading position or the loading position to the unloading position, respectively.

In alternate embodiments, a manual crank or hydraulic bottle jack may be employed in the alternative to the motor 111.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A cargo lifting device, comprising:
   a hitch attachment portion operative to selectively attach to a tow hitch of a target vehicle that includes an elevated cargo surface;
   a pivot member movably integrated with said hitch attachment portion; and
   a cradle member comprising at least one back bar and a support shelf attached to the at least one back bar, the support shelf having a first surface disposed on a plane of the at least one back bar and a second surface integrally formed with the first surface, and extending perpendicularly to the first surface and extending away from the plan of the at least one back bar,
   wherein the cradle member is attached to said pivot member,
   wherein said cradle member and pivot member are together selectively movable between a loading position in which the cradle member is adjacent to a ground surface and the second surface of the support shelf extends substantially parallel to the ground surface, and an unloading position in which the cradle member is adjacent to the elevated cargo surface of a target vehicle to which the hitch attachment portion is attached and the second surface of the support shelf extends substantially perpendicular to the ground surface,
   wherein the pivot member is configured rotate the cradle member from the load position to the unload position and to flip a load object disposed within the cradle member from an upright state in the load position to a laid-flat position in the unload state.

2. The cargo lifting device of claim 1, wherein said pivot member is movably integrated with said hitch attachment portion at a pivot such that the pivot member is hingedly integrated with said hitch attachment.

3. The cargo lifting device of claim 1, additionally comprising an actuator integrated with said hitch attachment portion and operative to supply a force sufficient to move the cradle member and pivot member between the loading position and unloading position.

4. The cargo lifting device of claim 3, wherein said actuator includes an electric motor.

5. The cargo lifting device of claim 4, wherein said actuator includes a wire which can be selectively dispensed and retracted by said motor and is configured to transfer force generated by said motor to said cradle member and pivot member in a manner which moves the cradle member and pivot member between the loading position and unloading position.

6. The cargo lifting device of claim 3, wherein said actuator includes a wire which can be selectively dispensed and retracted in a manner which moves the cradle member and pivot member between the loading position and unloading position.

7. The cargo lifting device of claim 1, wherein the hitch attachment portion, pivot member, and a cradle member define discrete, connectable structures.

8. A cargo lifting device, comprising:
   a discrete hitch attachment portion operative to selectively attach to a tow hitch of a target vehicle that includes an elevated cargo surface;
   a discrete pivot member movably integrated with said hitch attachment portion at a pivot such that the pivot member is hingedly integrated with said hitch attachment; and
   a discrete cradle member comprising at least one back bar and a support shelf attached to the at least one back bar, the support shelf having a first surface disposed on a plane of the at least one back bar and a second surface integrally formed with the first surface, and extending perpendicularly to the first surface and extending away from the plane of the at least one back bar,
   wherein the cradle member is attached to said pivot member,
   wherein said cradle member and pivot member are together selectively movable between a loading position in which the cradle member is adjacent to a ground surface and the second surface of the support shelf extends substantially parallel to the ground surface, and an unloading position in which the cradle member is adjacent to the elevated cargo surface of a target vehicle to which the hitch attachment portion is attached and the second surface of the support shelf extends substantially perpendicular to the ground surface, wherein the pivot member is configured rotate the cradle member from the load position to the unload position and to flip a load object disposed within the cradle member from an upright state in the load position to a laid-flat position in the unload state.

9. The cargo lifting device of claim 8, additionally comprising an actuator integrated with said hitch attachment portion and operative to supply a force sufficient to move the cradle member and pivot member between the loading position and unloading position.

10. The cargo lifting device of claim 9, wherein said actuator includes an electric motor.

11. The cargo lifting device of claim 10, wherein said actuator includes a wire which can be selectively dispensed and retracted by said motor and is configured to transfer force generated by said motor to said cradle member and pivot member in a manner which moves the cradle member and pivot member between the loading position and unloading position.

12. The cargo lifting device of claim 9, wherein said actuator includes a wire which can be selectively dispensed and retracted in a manner which moves the cradle member and pivot member between the loading position and unloading position.

* * * * *